Dec. 5, 1939.  E. M. DAVIS  2,182,335
METHOD OF DEODORIZING MILK AND CREAM
Filed Aug. 25, 1934  2 Sheets-Sheet 1

Elmer M. Davis
INVENTOR

Witness-
Wm C. Meiser

BY
ATTORNEY

Dec. 5, 1939.  E. M. DAVIS  2,182,335
METHOD OF DEODORIZING MILK AND CREAM
Filed Aug. 25, 1934  2 Sheets-Sheet 2
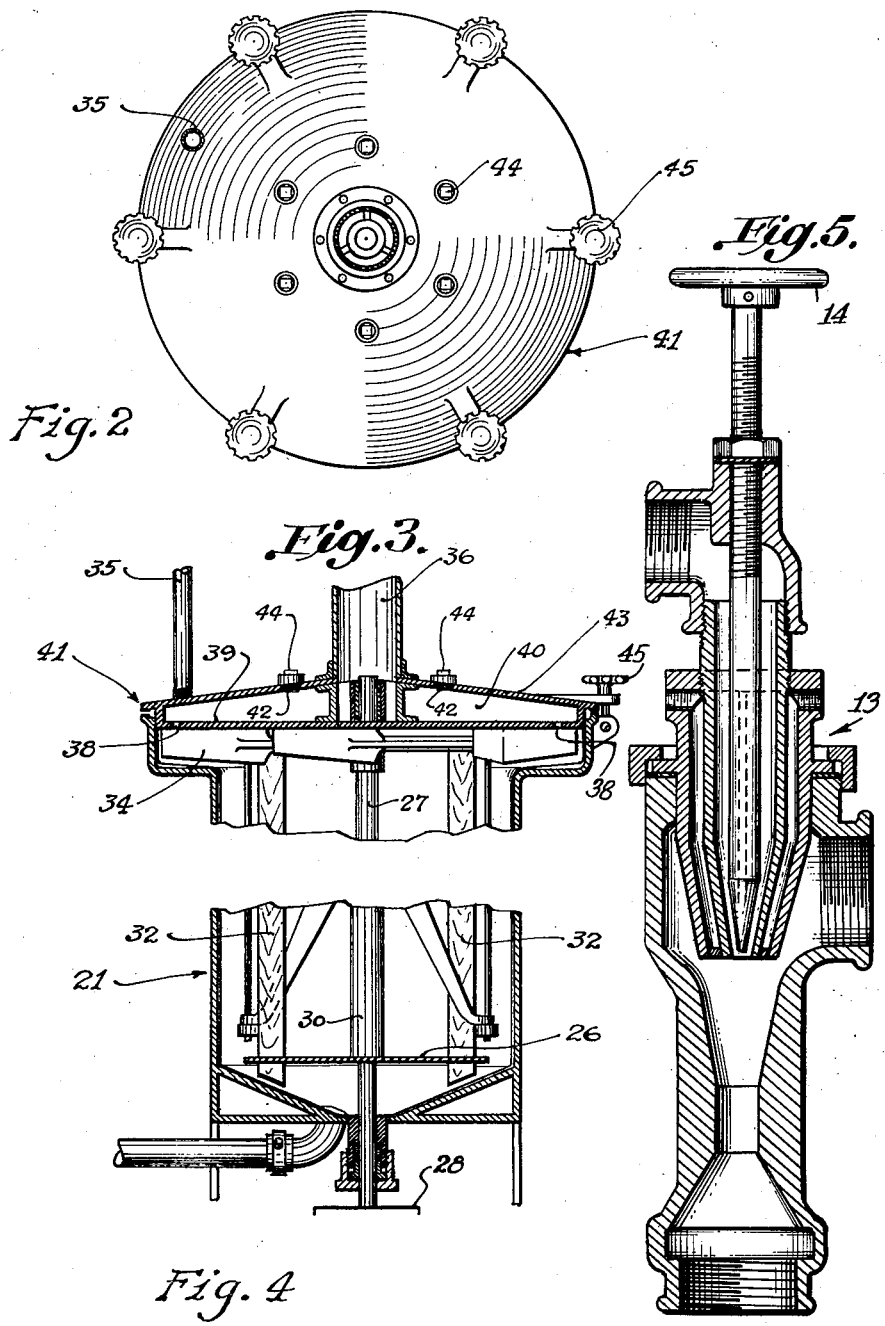
Elmer M. Davis
INVENTOR Patented Dec. 5, 1939

2,182,335

UNITED STATES PATENT OFFICE 2,182,335

METHOD OF DEODORIZING MILK AND CREAM

Elmer M. Davis, Chicago, Ill., assignor to Industrial Patents Corporation, Chicago, Ill., a corporation of Delaware Application August 25, 1934, Serial No. 741,483

4 Claims. (Cl. 99—61)

This invention relates to a method of deodorizing milk and cream.

One of the objects of the invention is to provide a method for removing objectionable odors from cream to be used in the manufacture of butter.

Another object of the invention is to remove onion odors and flavors from cream.

Other objects of the invention will be apparent from the description and claims which follow.

During portions of the pasturing season large quantities of cream are received at creameries from which an inferior grade of butter is produced due to flavors and odors derived from onions, strong grasses, weeds and the like consumed by the cows. Careless handling, improper storage and the like also result in the development of unpleasant, undesirable flavors and odors in cream, many of which are carried over into the butter churned from the cream.

Various methods have been proposed from time to time for deodorizing cream and some of the methods are more or less effective with certain types of flavors and odors.

One of the most persistent flavors found in cream is onion flavor and this flavor cannot be successfully removed from cream by heretofore known deodorizing methods. The method of the present invention involves the employment of temperatures a great deal higher than have heretofore been thought possible to use with cream without scorching the product.

The invention may be better understood by reference to the accompanying drawings in which similar reference characters in the several figures identify similar parts.

Figure 2 is a plan view of the top of the deodorizing chamber.

Figure 3 is a sectional view of the upper portion of the deodorizing chamber.

Figure 4 is a sectional view of the lower portion of the deodorizing chamber.

Figure 5 is a sectional view of the mixer employed in the system.

Figure 1:
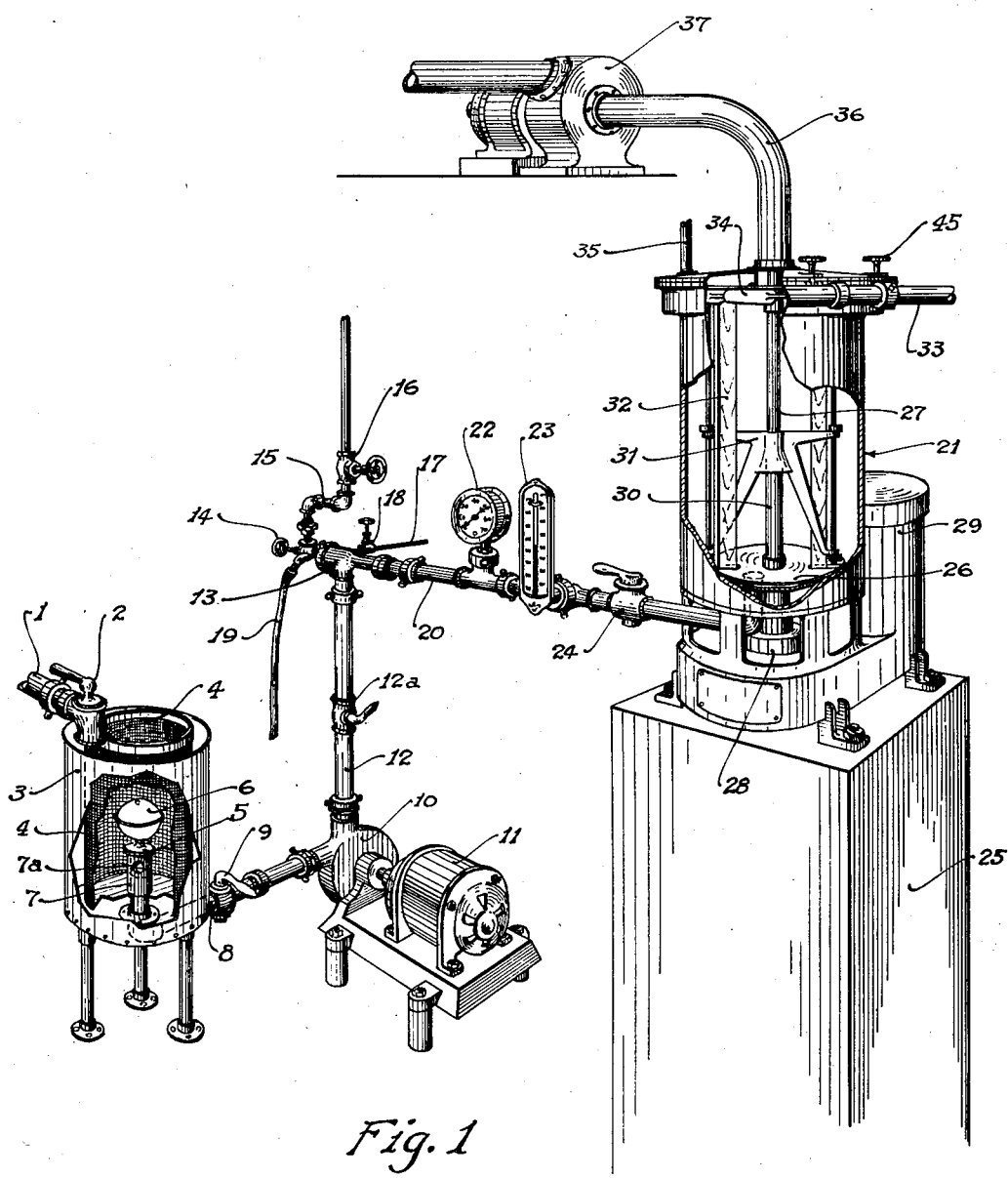
Figure 1 is a perspective view of equipment for carrying out the method of the present invention.

Referring now more particularly to Figure 1: After cream has been preheated by the ordinary flash pasteurizer method, the cream is carried through line 1 thence through valve 2 into receiving tank 3. Receiving tank 3 is provided with cylindrical wire screen 4 and float valve 5. Float valve 5 comprises float 6, sleeve 7, provided with opening 7a, and the intake end of line 8. Sleeve 7 is slidable on the intake end of line 8 within tank 3. Valve 5 is normally closed when the cream line falls sufficiently low to drop opening 7a below the top of line 8 thus preventing the pumping of air. Cream passes through float valve 5 and line 8 through valve 9 in line 8 to pump 10 driven by motor 11 and passes up through line 12, provided with valve 12a, to mixer 13. Mixer 13 is shown in section in Figure 5 and is fully described and claimed in my prior Patent No. 2,060,557, which issued Nov. 10, 1936, entitled mixing device.

Mixer 13 which is provided with handle 14 is provided with steam through line 15 provided with valve 16. Steam pressure passing through mixer 13 may be adjusted by manipulation of handle 14. The surface upon which the cream impinges on entering mixer 13 is cooled with cool water entering through line 17 provided with valve 18 and passing out through line 19. The mixture of cream and steam leaving mixer 13 passes through line 20 and enters deodorizer 21. Line 20 is provided with steam gage 22, thermometer 23 and valve 24.

Deodorizer 21 which is shown mounted upon block 25 is in construction a modified flash pasteurizer. The mixture of cream and steam entering deodorizer 21 through line 20 at the bottom is impinged against baffle plate 26. Shaft 27 is driven through gear box 28 by a motor not shown mounted in housing 29. Dasher sleeve 30 is mounted upon and rotates with shaft 27. Dasher arms 31 affixed to dasher shaft 30 carry dasher plates 32 causing the liquid to be swirled upwardly and driven out through line 33 by impeller plates 34 which are also mounted upon shaft 27 and rotate therewith.

Cream passing out through line 33 is conveyed to a cooling coil where it is given the usual treatment preparatory to churning. Additional steam is introduced into the deodorizer 21 through line 35 and the steam and other gases are drawn off through exhaust pipe 36 provided with fan 37.

The steam which enters through line 35 passes into the deodorizer through a plurality of holes 38 in plate 39, passing through chamber 40 in the cover 41 of the deodorizer 21. The presence of this steam is found to increase the efficiency of the device with certain types of cream. Where it is not desired to use steam at this point, holes 42 in top 43 of cover 41 may be opened by removing plugs 44 to admit air through chamber 40 and holes 38 to the upper portion of the deodorizer. Cover 41 may be held in position by any means as by screws 45.

In the operation of the device I have successfully used a steam pressure of fifty pounds measured on gage 22. The mixture of steam and cream at this point measured by thermometer ranges between 290° Fahrenheit to 300° Fahrenheit. The cream coming from the preheater or first pasteurizer enters receiving tank 3 at a temperature of about 180° to 195° Fahrenheit which, as is well known, is the temperature to which cream is conventionally heated in flash pasteurizers.

It will be noted that the temperatures to which the product is carried in accordance with the practice of my invention are extremely high and would be considered excessive in ordinary creamery practice. However, I have found in practice that cream treated in accordance with the present invention does not curdle or scorch. As has been pointed out, the mixer is water jacketed in such a manner as to assure a relatively cool surface for the initial contact of the cream entering the mixer and the rapid rise in temperature of the cream is not due to radiation from metallic parts but due to intimate admixture with the superheated steam.

It will be seen, therefore, that in its broadest sense the present invention contemplates the deodorization of fluids by admixture with superheated steam at temperatures above the boiling point. It will be seen further that the present invention does not depend upon the use of a vacuum to secure results nor is pressure per se a matter of any particular consequence.

It is true that the steam is admitted to the mixing chamber and added to the cream at a relatively high pressure but this is due to the fact that it is desired to raise the temperature of the cream to the neighborhood of 300° Fahrenheit, and in ordinary practice, as will be readily apparent from a study of the drawings, there is no appreciable pressure or vacuum in the deodorizer chamber proper. The pressure of the steam is compensated for by the fan in the exhaust line.

It will be noted that the cream entering the mixer 13 enters under pressure by reason of the action of the pump 10. Although not essential, it is preferable to have the cream enter the mixer at approximately the same pressure as the steam. This results in a more intimate and uniform admixture of the steam and cream and assures that the cream is in the mixer but momentarily.

I have found it advantageous in practice to add buttermilk in sufficient quantity to thin the cream down to about 25% butter fat which permits the odors to volatilize more readily.

I claim:

1. The method of deodorizing cream which comprises preheating the cream, mixing the preheated cream with superheated steam, discharging the mixture of superheated steam and cream in a chamber, drawing off steam and volatile gases escaping from the mixture in said chamber, removing the cream from the chamber and cooling the cream.

2. The method of deodorizing cream which comprises heating the cream to flash pasteurizing temperature, mixing the preheated cream with steam having a temperature substantially above the boiling point, conveying the mixture under pressure to an open chamber, drawing off steam and volatile gases from said chamber and thereafter cooling said cream.

3. The method of deodorizing cream which comprises heating the cream to flash pasteurizing temperature, mixing the preheated cream with steam having a temperature substantially above the boiling point, conveying the mixture under pressure to an open chamber, forcibly impinging the mixture of cream and steam against a baffle plate at the bottom of said chamber, swirling the cream up the walls of the chamber, drawing off steam and volatile gases and conveying said cream from said chamber and thereafter cooling said cream.

4. The method of deodorizing cream which comprises mixing preheated cream with superheated steam which is under substantial pressure and permitting the steam and volatile gases to escape in an open chamber.

ELMER M. DAVIS.